United States Patent
Chen et al.

(10) Patent No.: US 8,326,913 B2
(45) Date of Patent: Dec. 4, 2012

(54) METHOD AND SYSTEM FOR SERVICE CONTRACT DISCOVERY

(75) Inventors: Wei Chen, Beijing (CN); Sheng Zhu, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 625 days.

(21) Appl. No.: 12/492,084

(22) Filed: Jun. 25, 2009

(65) Prior Publication Data
US 2010/0332582 A1 Dec. 30, 2010

(51) Int. Cl.
*G06F 15/16* (2006.01)
(52) U.S. Cl. .................................. 709/202; 709/203
(58) Field of Classification Search .................. 709/202, 709/203; 715/810, 853
See application file for complete search history.

(56) References Cited

U.S. PATENT DOCUMENTS

| | | |
|---|---|---|
| 5,798,769 A | 8/1998 | Chiu et al. |
| 5,850,221 A | 12/1998 | Macrae et al. |
| 5,937,163 A | 8/1999 | Lee et al. |
| 5,953,724 A | 9/1999 | Lowry |
| 6,128,617 A | 10/2000 | Lowry |
| 6,154,750 A | 11/2000 | Roberge et al. |
| 6,259,451 B1 | 7/2001 | Tesler |
| 6,496,208 B1 | 12/2002 | Bernhardt et al. |
| 6,732,114 B1 | 5/2004 | Aamodt et al. |
| 6,816,175 B1 | 11/2004 | Hamp et al. |
| 6,859,823 B1 | 2/2005 | Nishihara et al. |
| 6,944,830 B2 | 9/2005 | Card et al. |
| 6,990,638 B2 | 1/2006 | Barksdale et al. |
| 7,080,077 B2 | 7/2006 | Ramamurthy et al. |
| 7,131,069 B1 | 10/2006 | Rush et al. |
| 7,149,959 B1 | 12/2006 | Jones et al. |
| 7,152,207 B1 | 12/2006 | Underwood et al. |
| 7,363,593 B1 | 4/2008 | Loyens et al. |
| 7,412,647 B2 | 8/2008 | Sellers et al. |
| 7,574,659 B2 | 8/2009 | Szabo |
| 7,603,632 B1 | 10/2009 | Aamodt et al. |
| 7,743,077 B2 * | 6/2010 | Gaurav ........................ 707/802 |
| 7,802,174 B2 | 9/2010 | Teng et al. |
| 8,161,413 B2 | 4/2012 | Chen et al. |
| 8,190,710 B2 | 5/2012 | Chen et al. |

(Continued)

FOREIGN PATENT DOCUMENTS

WO 2005/084285 A2 9/2005

(Continued)

OTHER PUBLICATIONS

12Manage Organization Chart http://www.12manage.com/methods_organization_chart.html, downloaded Nov. 20, 2008.

(Continued)

*Primary Examiner* — Joseph Avellino
*Assistant Examiner* — Marshall McLeod
(74) *Attorney, Agent, or Firm* — Kilpatrick Townsend & Stockton LLP

(57) ABSTRACT

Embodiments of the present invention are directed to techniques for automatically processing services in a service-oriented architecture. More specifically, services that are not already stored in a database are processed and then stored in a database using a service contract discovery process. The service contract discovery process can be performed when (1) a server provides service to a client computer; or (2) a server performs a scanning process to locate services that are not already stored in the database.

19 Claims, 9 Drawing Sheets

U.S. PATENT DOCUMENTS

| | | |
|---|---|---|
| 8,205,171 B2 | 6/2012 | Chen et al. |
| 2003/0218640 A1 | 11/2003 | Noble-Thomas |
| 2004/0169688 A1 | 9/2004 | Burdick et al. |
| 2004/0205594 A1 | 10/2004 | Arora et al. |
| 2004/0230917 A1 | 11/2004 | Bales et al. |
| 2005/0050477 A1 | 3/2005 | Robertson et al. |
| 2005/0071765 A1 | 3/2005 | Hallisey et al. |
| 2005/0108260 A1 | 5/2005 | Wenn et al. |
| 2005/0120005 A1 | 6/2005 | Tesch et al. |
| 2005/0165766 A1 | 7/2005 | Szabo |
| 2005/0262192 A1* | 11/2005 | Mamou et al. ............... 709/203 |
| 2006/0001647 A1 | 1/2006 | Carroll |
| 2006/0150169 A1 | 7/2006 | Cook et al. |
| 2006/0169688 A1 | 8/2006 | Mori et al. |
| 2006/0195575 A1 | 8/2006 | Delany et al. |
| 2007/0011316 A1 | 1/2007 | Araki et al. |
| 2007/0100848 A1 | 5/2007 | Vignet |
| 2007/0174160 A1 | 7/2007 | Solberg et al. |
| 2007/0185904 A1 | 8/2007 | Matsuzawa et al. |
| 2008/0028338 A1 | 1/2008 | Kodosky et al. |
| 2008/0091441 A1 | 4/2008 | Flammer et al. |
| 2008/0162616 A1 | 7/2008 | Gross et al. |
| 2009/0070337 A1 | 3/2009 | Romem et al. |
| 2009/0113350 A1 | 4/2009 | Hibino et al. |
| 2009/0144606 A1 | 6/2009 | Vignet |
| 2009/0164946 A1 | 6/2009 | Liddington |
| 2010/0287512 A1 | 11/2010 | Gan et al. |
| 2010/0325198 A1 | 12/2010 | Chen et al. |
| 2011/0055755 A1 | 3/2011 | Chen et al. |
| 2011/0055756 A1 | 3/2011 | Chen et al. |
| 2011/0055767 A1 | 3/2011 | Chen et al. |
| 2011/0055768 A1 | 3/2011 | Chen et al. |
| 2011/0055771 A1 | 3/2011 | Chen et al. |
| 2012/0174040 A1 | 7/2012 | Chen et al. |

FOREIGN PATENT DOCUMENTS

| | | |
|---|---|---|
| WO | 2007/111951 A2 | 10/2007 |
| WO | WO 2008-042677 A2 | 4/2008 |

OTHER PUBLICATIONS

Dill et al., A Continuously Variable Zoom for Navigating Large Hierarchical Networks http://ieeexplore.ieee.org/Xplore/login.jsp?url=/iel2/3184/9019/00399869.pdf?temp=x, 1994.

A Tutorial Introduction to Leo http://webpages.charter.net.edramleo/intro.html#clones-views, downloaded Nov. 17, 2008.

AA Orgchart Webpart http://www.aasoftech.com/Demo1/3LevelChart.htm, downloaded Nov. 20, 2008.

Advance Scripts: TreeTable—Java applet combines grid and tree view http://www.advancescripts.com/detailed/3201.html, downloaded Nov. 20, 2008.

Nation et al., Browse Hierarchical Data with the Degree if Interest Tree http://www2.parc.com/istl/groups/uir/publications/items/UIR-2002-12-Nation-CHI2002- DOIDemo.pdf, downloaded 2008.

Cogmap Organizational Charts http://www.cogmap.com/chart/google, downloaded 2008.

Create multiple views with one node on paging http://drupal.org/node/85720, downloaded Nov. 17, 2008.

Discussion Forum: Ittoolbox Groups Regarding to organization chart in asp.net http://c.ittoolbox.com/groups/technical-functional/csharp-1/regarding-to-organization-chart-in-aspnet-2191857, downloaded Nov. 20, 2008.

Dynamic Org chart and Form Designer tools http://jayankv.com/OrgChartDetails.aspx, downloaded Nov. 13, 2008.

Edrawsoft: How to draw Organizational charts http://www.edrawsoft.com/How-to-draw-org-charts.php, downloaded Nov. 13, 2008.

Zhao et al., Elastic Hierarchies: Combining Treemaps and Node-Link Diagrams http://www.dgp.toronto.edu/~sszhao/paperInforVis05_ElasticHierarchy.pdf, downloaded 2008.

Grouping Data in a Report http://msdn.microsoft.com/en-us/library/ms155903(SQL.90).aspx, downloaded Nov. 20, 2008.

IBM Information Management Software for z/OS Solutions Information Center http://publib.boulder.ibm.com/infocenter/dzichelp/v2r2/index.jsp?topic=/com.ibm.qmf.doc.visd.dsqvdmst50.htm, downloaded Nov. 13, 2008.

INAPORT Enterprise Data Integration for GoldMine http://www.databridgenow.com/what_we_do/inaport.pdf, 2002.

Integrated Multi-Views http://www.sciencedirect.com/science?_ob=ArticleURL&_udi=B6WMM-45J5BMS-P&_user=10&rdoc=1&_fmt=&orig=search&_sort=d&view=c&_acct=C000050221&_version=1&_urlVersion=0&_userid=10&md5=b16ea573128ea20191cc62fa49df0c46, Jun. 1998.

KNIME Quick Start Guide http://www.knime.org/quickstartguide.html, downloaded Nov. 17, 2008.

Microsoft Help and Support: Organization charts from Office 2000 programs appear different in Office XP programs http://support.microsoft.com/kb/293615. downloaded Nov. 20, 2008.

Stolte et al., Multiscale Visualization Using Data Cubes http://graphics.stanford.edu/papers/pan_zoom/paper.pdf, downloaded 2008.

Schaffer et al., Navigating Hierarchically Clustered Networks Through Fisheye and Full-Zoom Methods http://www.markroseman.com/pubs/fisheyetochi96.pdf, 1998.

Organization chart view modes http://www.ilog.com/documentation/elixir10/en-US/Content/Visualization/Documentation/Elixir/_pubskel/ps_elixir82.html, downloaded Nov. 20, 2008.

Organization chart http://www.longbowcg.com/home/services/downloads/coursewarevol2pdf.pdf, downloaded on or before Oct. 2010.

OrgPlus Professional Tour http://www.orgplus.com/products/orgplus-professional/orgplus-professional-tour.htm#, downloaded Nov. 17, 2008.

OrgPublisher http://www.orgpublisher.com/docs/pdf/v8/OP8_datasheet.pdf, downloaded on or before Oct. 2010.

Polarion: 1. Portal Tour—Chapter 2. User Guide http://www.polarion.com/products/alm/help/ug_quicktour.html, downloaded Nov. 20, 2008.

Quixa Organization chart http://www.quixa.com/bpmsuite/orgchart.asp, 2008.

Readerware views http://www.readerware.com/help/rwViews.html, downloaded Nov. 20, 2008.

PLUMLEE et al., Zooming, Multiple Windows, and Visual Working Memory http://ccom.unh.edu/vislab/PDFs/Zoom_Multi_VisualWM_final.pdf, 2008.

U.S. Appl. No. 12/490,250, filed Jun. 23, 2009, 40 pages.
U.S. Appl. No. 12/563,069, filed Sep. 18, 2009, 51 pages.
U.S. Appl. No. 12/563,071, filed Sep. 18, 2009, 40 pages.
U.S. Appl. No. 12/563,075, filed Sep. 18, 2009, 35 pages.
U.S. Appl. No. 12/563,082, filed Sep. 18, 2009, 32 pages.
U.S. Appl. No. 12/563,085, filed Sep. 18, 2009, 31 pages.
U.S. Appl. No. 12/490,250, filed Jun. 23, 2009, Office Action mailed Apr. 1, 2011, 8 pages.

"AA OrgChart Webpart." at URL: http://www.aasoftech.com/Products/OrgChartwebpart/Default.asp, downloaded Nov. 20, 2008; Copyright 1997-2007, AASoftech Inc, 1 page.

"Different Context Menus depending on selected Node in Tree View-Xtreme Visual Basic Talk," at URL: http://www.xtremevbtalk.com/showthread.php?t=85288, downloaded Nov. 18, 2008, 3 pages.

"InfoPath Team Blog: recursive Controls support in Infopath," 2003 SP1 at URL: http://blogs.msdn.com/infopath/archive/2004/06/24/164988.aspx;copy, downloaded Dec. 15, 2008, Copyright 2008, Microsoft Corporation, 4 pages.

"JSF portlet with JWL Data Tree Component," at URL: http://www.ibm.com/developerworks/forums/thread.jspa?threadID=161906, downloaded Nov. 18, 2008, 4 pages.

"KWizCom Organization Chart web part Installation & User Guide" Copyright 2005, KWizCom LTD, pp. 1-22.

"McGill Organizational Chart" McGill Organizational Chart Manual-Version Aug. 2, 2005; 11 pages.

"OrgPlus Professional Tour: 6. Show chart data in multiple views" at URL:http://www.orgplus.com/products/orgplus-professional/orgplus-professional-tour.htm#, downloaded Nov. 20, 2008, Copyright 2000-2008, HumanConcepts, 1 page.

OrgPlus Professional Tour 5. Create multiple customized chart views to present employee data differently, at URL:http://www.orgplus.com/products/orgplus-professional/orgplus-professional-tour.htm#, downloaded Nov. 20, 2008, 2000-2008, Copyright HumanConcepts, 2 pages.

"Org Chart Test" at URL: http://sandpit.reitsma.net.au/googleOrg/OrgChartTest.html; downloaded Dec. 15, 2008, 1 page.

Perkins, "Create an organizational chart with HTML, VML, and XML," downloaded Dec. 15, 2008, 3 pages.

"Sage Abra OrgPlus Professional" Copyright 2007, Sage Software, 2 pages.

"Support Organization Chart" at URL: http://resources2.visual-paradigm.com/index.php/release-vp33/55-vp33/91-org-chart.pdf, Last updated Aug. 11, 2008, 5 pages.

"TreeView Nodes and ContextMenuStrip" at URL:http://www.devnewsgroups.net/group/microsoft.public.dotnet.framework.windowsforms/topic53850.aspx, downloaded Nov. 18, 2008, 5 pages.

"The Most Trusted Name in Enterprise Organizational Charting and Reporting," OrgPublisher, at URL:http://www.ilog.com/documentation/elixir10/enUS/Content/Visualization/Documentation/Elixir/_pubskel/ps_elixir82.html, downloaded Nov. 20, 2008, 2 pages.

"Understanding Data Graph Window Areas," at URL:http://docs.hp.com/en/B6454-97413/ch08s02.html, downloaded Nov. 18, 2008; Hewlett-Packard Development Company 2000, L.P, 3 pages.

U.S. Appl. No. 12/563,069, filed Sep. 18, 2009, Notice of Allowance mailed Dec. 15, 2011, 9 pages.

U.S. Appl. No. 12/563,071, filed Sep. 18, 2009, Notice of Allowance mailed Mar. 8, 2012, 8 pages.

U.S. Appl. No. 12/563,075, filed Sep. 18, 2009, Office Action mailed Jan. 24, 2012, 13 pages.

U.S. Appl. No. 12/563,082, filed Sep. 18, 2009, Office Action mailed Jan. 25, 2012, 12 pages.

U.S. Appl. No. 12/563,085, filed Sep. 18, 2009, Office Action mailed Jan. 26, 2012, 12 pages.

U.S. Appl. No. 12/490,250, filed Jun. 23, 2009, Notice of Allowance mailed Feb. 3, 2012, 8 pages.

U.S. Appl. No. 12/490,250, filed Jun. 23, 2009, Office Action mailed Sep. 28, 2011, 4 pages.

U.S. Appl. No. 12/563,082, filed Sep. 18, 2009, Final Office Action mailed May 29, 2012, 13 pages.

U.S. Appl. No. 12/563,085, filed Sep. 18, 2009, Final Office Action mailed May 29, 2012, 13 pages.

U.S. Appl. No. 13/459,447, filed Apr. 30, 2012, Office Action mailed Jun. 22, 2012, 9 pages.

* cited by examiner

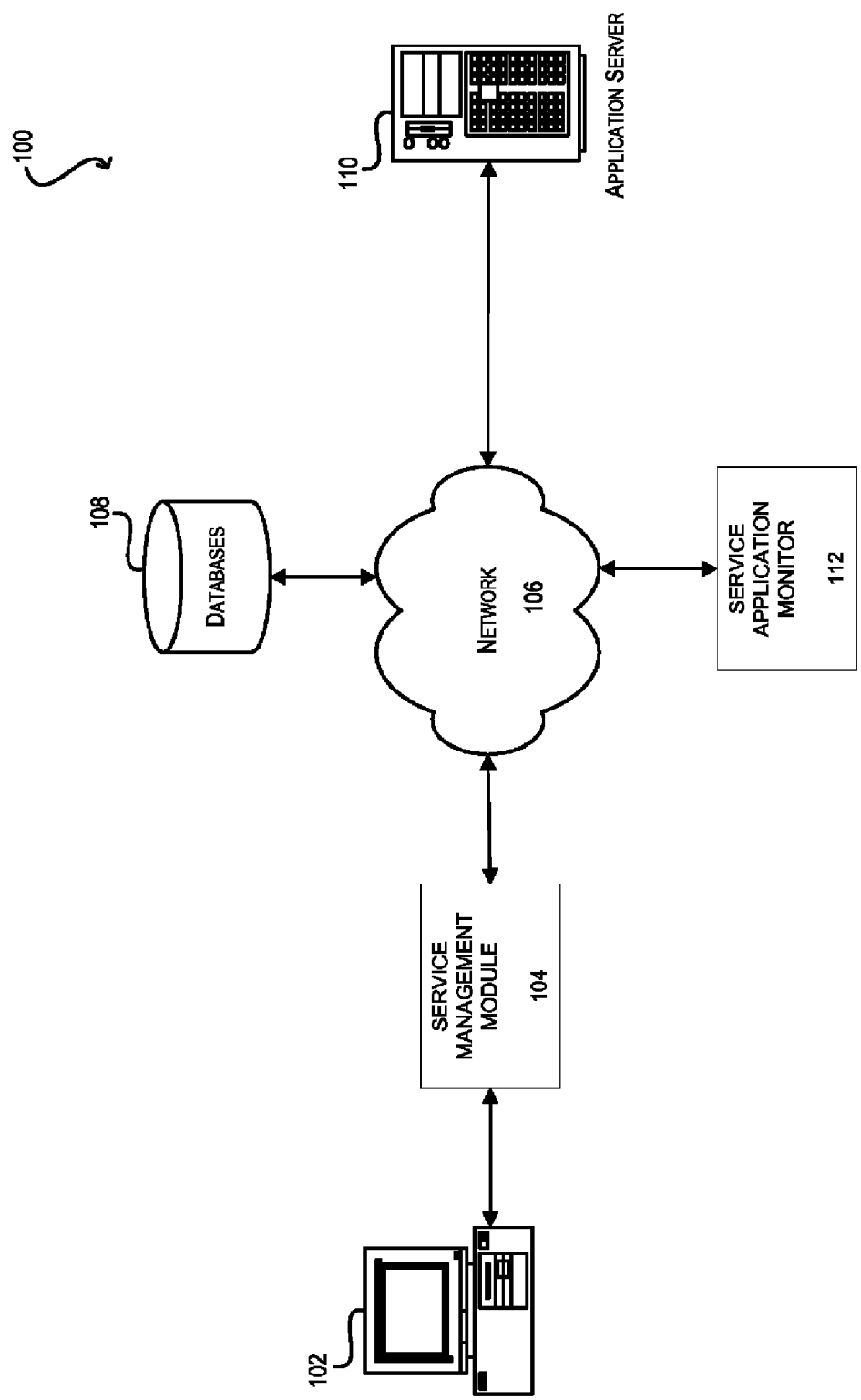

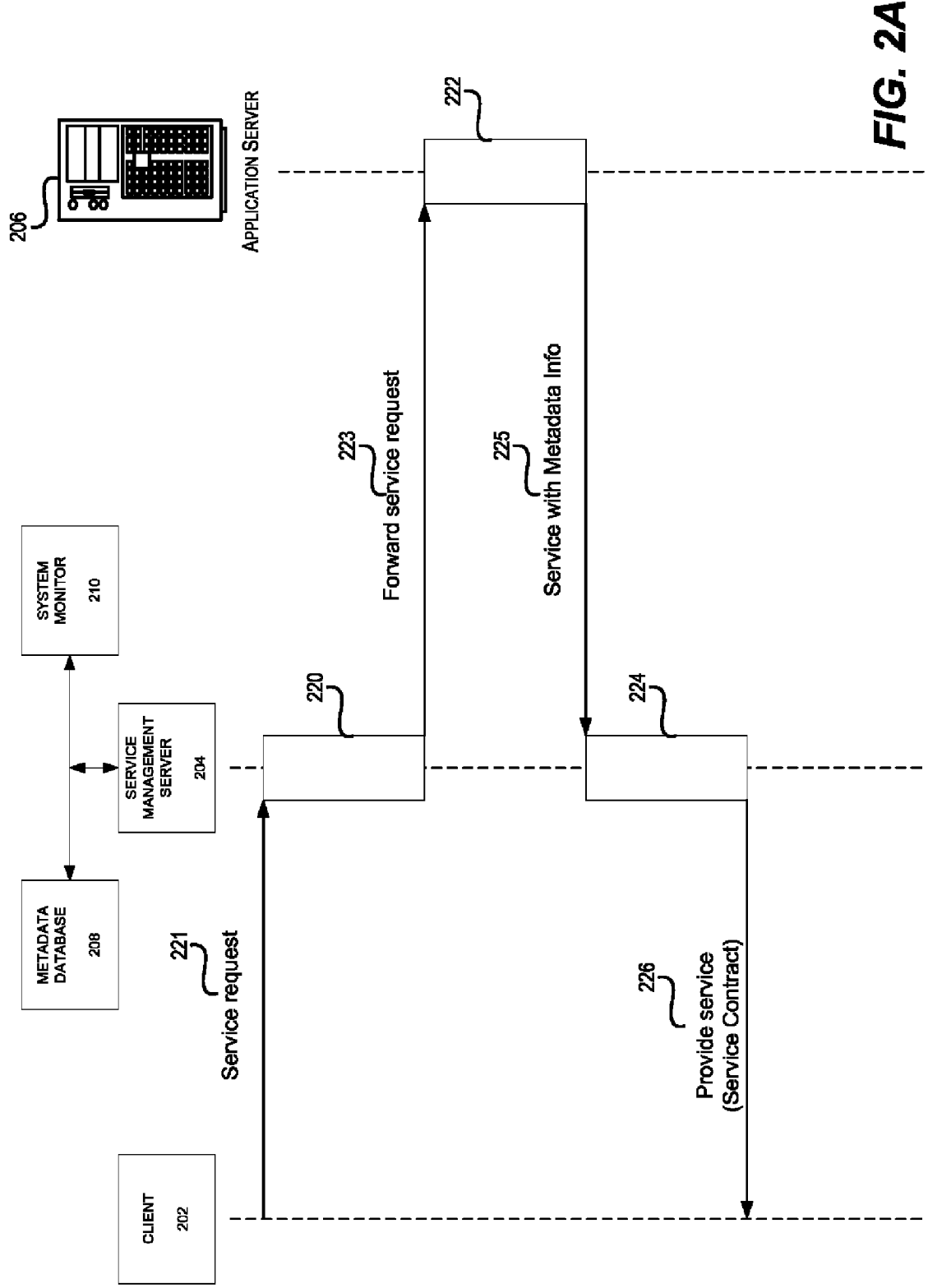

METHOD AND SYSTEM FOR SERVICE CONTRACT DISCOVERY

CROSS-REFERENCES TO RELATED APPLICATIONS

Not Applicable

BACKGROUND OF THE INVENTION

Embodiments of the present invention are directed to techniques for automatically processing services in a service-oriented architecture.

In recent years, computer networks have become ubiquitous. In addition to providing data communication solutions, computer networks are also used to provide various services. For example, a server on a computer network will provide services to a client computer over the computer network. Typically, a service oriented architecture is used for providing services to client computers.

For services to be usable, management entities, such as the Tuxedo™ system are often used as the middleware that processes the services to allow client computers to locate and use the services. For example, to properly handle a service, servers look up a database where information associated with services is stored. Unfortunately, the database does not always contain information associated with various services.

Therefore, it is desirable to have techniques for discovering and processing services.

BRIEF SUMMARY OF THE INVENTION

Embodiments of the present invention are directed to techniques for automatically processing services in a service-oriented architecture. More specifically, services that are not already stored in a database are processed and then stored in a database using a service contract discovery process. The service contract discovery process can be performed when (1) a server provides service to a client computer; or (2) a server performs a scanning process to locate services that are not already stored in the database. There are other variations as well.

In an embodiment, the present invention provides a computer-readable storage medium comprising processor executable codes. The computer-readable storage medium includes code for accessing at least one application server, the at least one application server storing at least a first service, the first service being characterized by a first set of metadata, the first set of metadata including a plurality of fields. The computer-readable storage medium also includes code for processing the first set of metadata. The computer-readable storage medium further includes code for obtaining at least a first identification from the first set of metadata. The computer-readable storage medium additionally includes code for accessing a metadata database, the metadata database being configured to store a metadata information associated with services. The computer-readable storage medium includes code for searching the metadata base for the first service using at least the first identification. The computer-readable storage medium includes code storing the first set of metadata in the metadata database in a first format.

In one specific embodiment, the computer-readable medium also includes code for processing a service request from a computer, code for locating the first service, and code for providing the first service to the computer.

In one specific embodiment, the computer-readable medium also includes code for processing a service request from a terminal, code processing the service request, code for looking up the metadata database in response to the service request, and code for defining a service contract for the first service using the first set of metadata stored in the metadata database.

In one specific embodiment, the computer-readable medium includes code for obtaining a second set of metadata from the metadata database and code for providing a second service with the second set of metadata.

In one specific embodiment, the metadata database is stored on a metadata database repository server.

In one specific embodiment, the computer-readable medium includes code for determining a license associated with the first application.

In one specific embodiment, the computer-readable medium includes code for establishing a communication link between the application server and a computer.

In another embodiment, the present invention provides a system for providing services. The system includes a communication network. The system includes a first computer connected to the communication network, the first computer being adapted to send a first service request. The system includes a metadata database for storing metadata information associated with services. The system includes a first application server, the first application server storing at least a first service, the first service being characterized by a first set of metadata, the first set of metadata including a plurality of fields. The system includes a service management module, the service management module being adapted to receive the first service request from the first computer via the communication network. The service management module processes the first service request. The service management module locates the first service in response to the first service request. The service management module obtains the first set of metadata from the first application server. The service management module processes the first set of metadata. The service management module accesses the metadata database to determine if the metadata database includes information associated with the first set of data. The metadata database generates and stores information associated with the first set of data if the metadata database does not include information associated with the first set of data.

In one specific embodiment, the system includes a plurality of application servers connected to the service management module through the communication network.

In one specific embodiment, the metadata database is stored in a service metadata repository server.

In one specific embodiment, the system includes a service monitoring module configured to monitor service requests.

In one specific embodiment, the service management module comprises a Tuxedo™ server.

In one specific embodiment, the system is associated with a service-oriented architecture.

According to yet another embodiment, the present invention provides a method for operating providing one or more services in a network environment. The method includes providing a communication network. The method includes providing a service management module. The method includes providing a first server, the first server comprising a first service, the first service being characterized by a first set of metadata, the first set of metadata including a plurality of fields. The method includes providing a metadata database for storing metadata information associated with services. The method includes accessing the first set of metadata stored at the first server by the service management module. The method includes accessing the metadata database to determine if the metadata database includes information associated with the first set of data. The method includes generating and storing the information associated with the first set of metadata if the metadata database does not include information associated with the first set of data.

In one specific embodiment, the method includes scheduling a scanning for services.

In one specific embodiment, the method includes storing the information associated with the first set of metadata in a table format.

In one specific embodiment, the method includes summarizing the first set of data to generate the information associated with the first set of metadata.

In one specific embodiment, the method includes forward parameters from the information associated with the first set of metadata to a client computer.

In one specific embodiment, the information associated with the first set of metadata comprises a service contract pattern.

The embodiments of the present invention are to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

BRIEF DESCRIPTION OF THE DRAWINGS

FIG. 1 is a simplified diagram illustrating a service management system according to an embodiment of the present invention.

FIG. 2A is simplified flow diagram illustrating a process for discovering a service contract according to an embodiment of the present invention.

DETAILED DESCRIPTION OF THE INVENTION

Figure 2B:
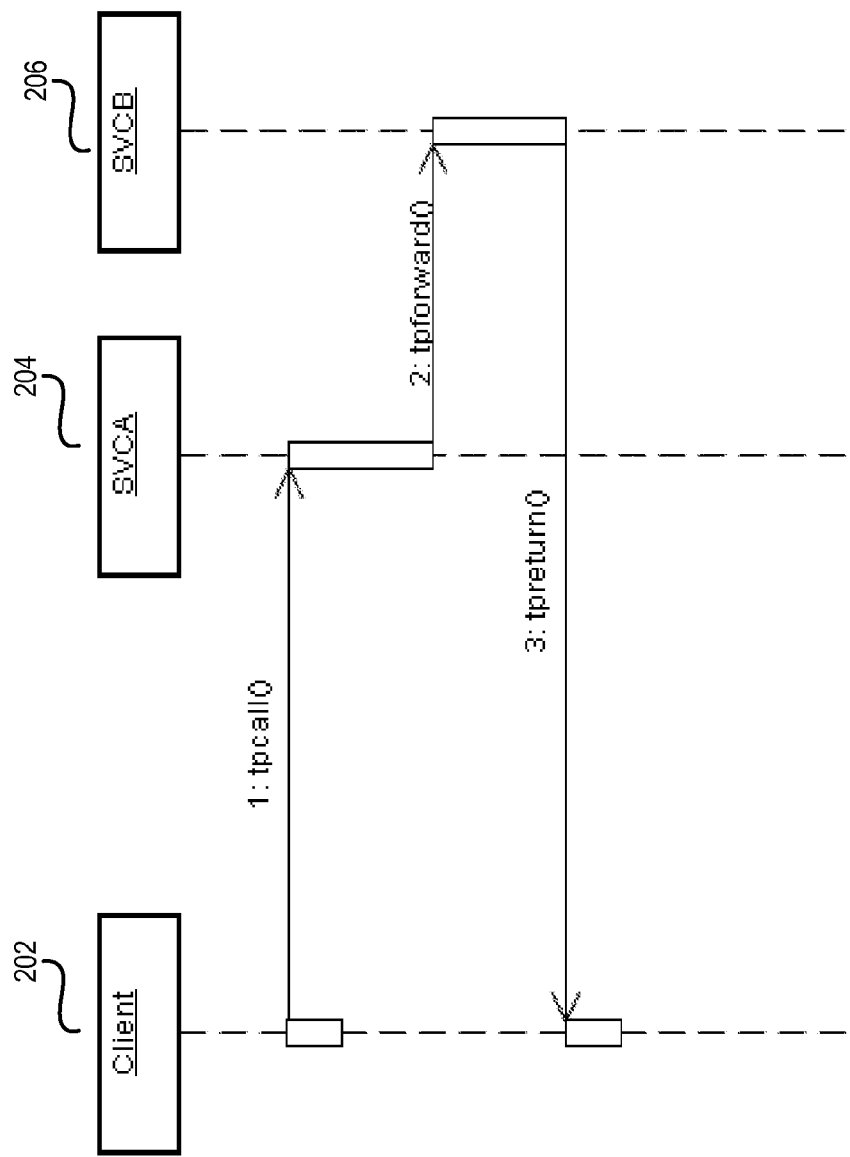
FIG. 2B is a simplified timing diagram illustrating forwarding of service contract information according to an embodiment of the present invention.

Embodiments of the present invention are directed to techniques for automatically processing services in a service-oriented architecture. More specifically, services that are not already stored in a database are processed and then stored in a database using a service contract discovery process. The service contract discovery process can be performed when (1) a server provides service to a client computer; or (2) a server performs a scanning process to locate services that are not already stored in the database. There are other variations as well.

In computing, service-oriented architecture (SOA) provides methods for systems development and integration where systems package functionality as interoperable services. An SOA infrastructure allows different applications to exchange data with one another. For example, service-orientation aims at a loose coupling of services with operating systems, programming languages and other technologies that underlie applications.

For an SOA infrastructure to work, a middleware software is typically used to facilitate the use of services among various computing elements. One of the most commonly used middleware is Tuxedo™ system from Oracle™. Among other features, Tuxedo™ facilitates services among servers by using a message routing and queuing system.

Requests from one computer are sent to named services and Tuxedo™ uses memory based communication facilities to queue the requests to servers. The requester is unaware of where the server that actually processes the request is located or how it is implemented. Among other features, Tuxedo™ can use the content of the message to determine what servers should be utilized to receive the request by means of data dependent routing. The selected server(s) then provide services in response to the requests.

Services are an important aspect of the SOA systems. Typically, for services to be useful, service contacts containing useful service information, such as service identification, service handling, and service protocol, are used in sharing services. Moreover, the service contract information makes it easier to reuse existing services or export them as in Web Service by SALT.

In an SOA that utilizes Tuxedo™, central repository is provided to store service metadata information that lacks the ability to discover that information automatically. In the past, a user needed to manually input information for the service and then load it into the repository.

There are many drawbacks with the conventional approaches regarding the service contract information. It is a tedious task, especially in a large system that has already been in production for several years because (1) knowledgeable personnel (e.g., people who designed the service contract) change jobs; (2) service contracts become outdated; and (3) the large number of services. Therefore, it is to be appreciated that embodiments of the present invention provide a way for discovering and storing service contracts. In a specific embodiment, the method of service contract discovery is integrated as a part of the Tuxedo™ system.

FIG. 1 is a simplified diagram illustrating a service management system according to an embodiment of the present invention. This diagram is merely an example, which should not unduly limit the scope of the claims. One of ordinary skill in the art would recognize many variations, alternatives, and modifications.

As shown in FIG. 1, a networked computing environment 100 includes the following:
1. a client computer 102;
2. a service management module 104;
3. a network 106;
4. a database 108;
5. a service application monitor 112; and
6. an application server 110.

According to various embodiments, the network computing environment 100 is in a service-oriented architecture (SOA). In this architecture, the service management module facilitates application servers (e.g., application server 110) to provide services to the client computer 102. Using the SOA, the networking computing environment 100 allows different applications to exchange data with one another. In various embodiments, the networking computing environment 100 is implemented using Tuxedo™ systems.

The application server 110 provides services to the client computer 102 by passing data through the network 106, and this process is coordinated by the service management module 104. For example, the service management module 104 comprises a Tuxedo™ server. When the application server 110 provides services to the client computer 102, the services are provided as service contracts. As an example, a service contract contains services that are compliant with a communication agreement (e.g., defined by Tuxedo™ system), which may include information such as name, information of request buffer, reply buffer and error buffer if present, for a service.

For services from the application server 110 to be useful to the client computer 102, the services from the application server 110 may be processed by the service management module 104. Among other features, the service management module 104 ensures that services provided by the application server 110 are usable to the client computer 102. For example, services from the application server 110 are provided as service contracts.

As an example, the service management module 104 and application server are both parts of a Tuxedo™ system. For example, a Tuxedo™ system is at its core a message routing and queuing system. Requests are sent to named services and Tuxedo™ uses memory based inter-process communication facilities to queue the requests to servers. The requester is unaware of where the server that actually processes the request is located or how it is implemented. In essence, Tuxedo™ uses the content of the message to determine what servers should be utilized to receive the request by means of data dependent routing. For example, services contracts are messages for providing services.

When service contracts are communicated between the client computer 102 and the application server 110 through the service management module 104, the service application monitor module 112 processes information from the service contract. According to an embodiment, Service Architecture Leveraging Tuxedo™ (SALT), a functional module is added to the Tuxedo™ as an add-on product for Tuxedo™ to export Tuxedo™ service as a web service, and vice-versa. For example, SALT can be implemented as a part of the service management module 104, the service application monitor 112, and/or application server 110. In a specific embodiment, a version of SALT (i.e., version 10gR3) includes a feature that allows the discovery of service contracts. By examining the messages exchanged between ATMI clients and servers, SALT can infer a service contract for the service. This information can then be loaded in the Tuxedo™ metadata repository and used in exposing the service as a Web service or by development tools. In an embodiment, the service application monitor comprise a Tuxedo™ System and Application Monitor (TSAM), which is used as an add-on product for Tuxedo™. For example, for the purpose of tracking and storing service contract information, the TSAM function is a "tmadmin" mode, in which the Tuxedo™ administration utility operates in a console mode.

The service application monitor 112 can be a part of the service management module 104 and/or the application server 110. For example, the service application monitor 112 comprises a Tuxedo™ System and Application Monitor (TSAM), which is an add-on product for Tuxedo™.

The database 108 is used to store, among other things, metadata associated with service contracts. In various embodiments, the database 108 includes a metadata repository database, which is used as a central storage for Tuxedo™ service metadata. In an embodiment, the service application monitor 112 processes information associated with a contract that is being sent from the application server 110 to the client computer 102. The service application monitor 112 processes the service contract and stores it in the database 108 if the database does not already contact information for the service contract.

Depending on the specific application, the process for depositing service contract information may be performed in various ways, as will be described below. In addition to adding service contracts that are being sent from application server to the client computers, automatic service contract discovery processes may also be used. For example, the service application monitor 112 may search for service contracts on application servers that are not stored in the database periodically. There are other methods as well.

FIG. 2A is simplified flow diagram illustrating a process for discovering service contracts according to an embodiment of the present invention. This diagram is merely an example, which should not unduly limit the scope of the claims. One of ordinary skill in the art would recognize many variations, alternatives, and modifications. For example, various steps may be added, removed, repeated, replaced, rearranged, and/or overlapped.

Shown in FIG. 2A, a client computer 202 sends a service request 221 to a service management 204 server. As explained above, a service request 221 may be sent as a service contract request that is sent using a specific format. For example, the format complies with Tuxedo™ message format.

The service request 221 is received by the service management server 204 and processed at step 220. As shown, the service management server 204 is connected to a system monitor 208 and a metadata database 208. But it is understood that the system monitor 210 and the metadata database 208 may be components of the service management server 204. During the step 220, the service management server 204 determines what service is need and where the service can found. As an example, the service management server 204 determines that the application server 206 has the service that the client computer 202 requested. The application server 206 may be on the same network domain with the service management server 204 or on a different domain.

The service management server 204 forwards service request at step 223 to the application server 206. Upon receiving the service request, the application server 206 determines the service needed and provides a service contract at step 222. For example, for the service to be useful to the client computer 202, the service is provided as a service contract with metadata associated with the service contract.

Depending on the application, the service contract from the application server 206 may be directly sent to the client computer 202 or sent through the service management server 204. As an example, the service contract is first sent to the service management server 204 at step 225 with metadata information associated with the service contract. The service management server 204 then processes the service contract and the metadata thereof at step 224.

Upon receiving the service contract and the metadata thereof, the service management server 204 processes both the service contract and the metadata. In various embodiments, the service management server looks up the metadata database 208 to determine if information associated with the service contract is already stored in the metadata database

208. For example, if the metadata database 208 already contains information associated with the service contract, the service management server 204 forward the service contract to the client computer 202, along with additional information from the metadata database 208 if necessary. Meanwhile, the system monitor 210 monitors the service contract forwarding operation.

On the other hand, if the metadata database 208 does not contain information associated with the service contract, a new record is created at the metadata database 208 to store information for the service contract. A specific process is used to automatically discover service contract information at run time. The service contract, along with the metadata if any, is first processed. A set of information is generated and put into a metadata repository at the metadata database 208 automatically. In an alternative embodiment, the user is prompted to load information associated with the service contract into the metadata repository later manually using a specific utility (e.g., a Tuxedo™ function).

As an example, generated service contract information contains service name, request buffer information, response buffer information, and error buffer information if there is failure case found. The buffer information includes buffer type and subtype, and field information for FML/FML32 (name, type, subtype). In a specific embodiment, for the type of VIEW/VIEW32/X_C_TYPE/X_COMMON, only the view name is required. For example, the SALT gateway GWWS and SCA can load the binary VIEW description files automatically based on view name.

In an embodiment, the user may configure view member contents in metadata repository, which usually involves platform-specific information. For example, field information for FML32/VIEW32 field embedded in a FML32 buffer is included as well. For FML/FML32 field occurrence, the discovery process automatically updates the pattern for the count and/or required count in the metadata repository. In various embodiments, field occurrence does not impact pattern. The minimum occurrence is referred to as "required count;" the maximum occurrence is referred to as "count" during the contract discovery process.

In certain embodiments, the service contract discovery process is restricted to specific types of services. For example, only application ATMI services (local, or imported via /TDOMAIN gateway) are supported. The discovery does not entail these types of services: system service (name starts with '.' or '..'), conversational service, CORBA service, /Q and SALT proxy service, etc. Such restriction on service type prevents users from potentially damaging normal operations.

The automatic discovery of service contract may be initiated in various ways. For example, the discovery process may be enabled using command line:

---

New TMMETADATA command line options for this feature
Configuration
-t and scd fulush are to be removed.

| Option | Description |
|---|---|
| -o <filename> | Specifies the name of the file to store recognized pattern. When this option is present, patterns will be output to this file instead of to the metadata repository. This option should be specified if "-r" (read only) option is set otherwise recognized pattern will be lost. Existing patterns in metadata repository are ignored by TMMETADATA when checking whether a pattern is duplicated if a file is selected as the storage. TMMETADATA will read this file at startup to avoid reporting of duplicated pattern. The file will be overwritten with new recognized pattern and old pattern existed in the file before TMMETADATA startup. |

---

A service discovery can be activated or deactivated from SALT without interference.

In an embodiment, the service discovery is accessed using a command line name "tmscd" in SALT. The usage of this command line is described below:

---

Name
tmscd    -- command line utility to activate and deactivate service contract discovery.
Synopsis
tmscd [-e][-f <file>]start|stop|status [id1 [ id2 [ ...]]]
Description
tmscd is the command line utility to activate and deactivate service contract automatically discovery feature. It accepts following parameters:
-e
    The service scope is specified with regular expression.
-f <file>
    The service scope is defined in given <file>. The file may contain sections to group related definitions together. All entries for a section must be written together line by line.
    Empty line or line starts with '#' will be ignored. A line starts with '*' is treated as a section line. Other lines are the definitions in the format of "id=content".
start|stop|status
To start, stop, or display setting for service contract automatically discovery for services, or all services if no service is specified.
A request to start or stop discovery for a service which automatically discovery is already activated or deactivated will be ignored.
Information for effective services will be shown when handling the requests.
id1 id2 ...
One or more service, or regular expression to match services if
-e is specified. If -f is specified, the effective service will be obtained from <file>. The format of the identifier is as "[section '.']identifier" when -f is provided.
tmscd will fail if TMMETADATA is not booted or booted with "-r" (readonly) option with an ERROR message in console to denote this failure.
Please see following for some use cases.
use case 1: start discovery for TOUPPER, TOLOWER
    tmscd start TOUPPER TOLOWER

```
use case 2: start discovery for services started with TO and BR
    tmscd -e start TO.* BR.*
use case 3: same request as use case 1 but via file
    tmscd -f svcfile start id1 id2
    Please note that the first found definition will be used if section is provided.
use case 4: same request as use case 2 but via file
    tmscd -e -f svcfile start case4.svcs
The content of the file named "svcfile"is as following:
# file: svcfile
*case3
id1= TOUPPER
id2= TOLOWER
*case4
svcs= TO.*|BR.*
```

Once a new service contract and/or metadata thereof is detected, it is processed to conform to a predefined format. As an example, the processing of service contract information is provided by a Tuxedo™ server, which gathers raw data and summarizes contract information. The result can be output to a file and/or loaded into metadata repository automatically. In a specific embodiment, the file is in the format requested by a function named "tmloadrepos," which is a utility to load service information into metadata repository.

In various embodiments, the service contract is summarized based on buffer type and fields in buffer for the request, reply buffer (both success and failure case if present) for each service. For example, each distinguished result is referred to as a pattern which presents one type of contract for the service. Pattern can be used to distinguish service contract information which includes information of request and reply buffer for a service. For example, buffer information includes buffer type, subtype and information of fields contained if the buffer is of type FML/FML32.

During the discovery process, patterns of service contracts are processed. A pattern is identified by the service name, information of the request, reply or error buffer. Buffer information includes buffer type, subtype and information of fields contained if the buffer is of type FML/FML32. For example, analysis of patterns is performed in real time as contract information record arrives.

In an embodiment, a new pattern will be flushed to metadata repository immediately if metadata repository is selected as the storage. Alternatively, patterns that are recognized when the server is started are selected to be output to a file at a specified interval and/or on demand.

The discovery process for service contracts may be turned off in certain situations. For example, a server automatically generates Tuxedo™ service contract information (service name, request buffer type, response buffer type) for existing ATMI services, and the server summarizes the collected data to an output file which can be put into metadata repository. In a specific embodiment, the service contract discovery does not provide for (1) ATMI service with names starting with '.' or '..' (i.e., system services); (2) conversational, /Q, and CORBA services; and (3) SALT proxy services.

To provide an example, the discovery process for processing service contract patterns is described below.

```
Use case 1, 2 and 3 shows that there is no combination for success and error reply.
Use case 1:
Input:
    service=SVC, request=STRING, reply = TPSUCCESS + STRING
Output Pattern:
    service=SVC_1,tuxservice=SVC,inbuf=STRING,outbuf=STRING
Use Case 2:
Input:
    service=SVC, request=STRING, reply = TPFAIL+ STRING
Output Pattern (partial):
    Service=SVC_1, tuxservice=SVC,inbuf=STRING,outbuf=NULL,errbuf=STRING
Use Case 3:
Input:
    service=SVC, request=STRING, reply = TPSUCCESS + STRING
    service=SVC, request=STRING, reply = TPFAIL+ STRING
Output Pattern:
    service=SVC_1,tuxservice=SVC,inbuf=STRING,outbuf=STRING
    Service=SVC_2, tuxservice=SVC,inbuf=STRING,outbuf=NULL,errbuf=STRING
Use case 4 and 5 shows that for FML/FML32 different field set means different pattern,
and the occurrence for the field is ignored.
Use Case 4:
Input:
    service=FMLS,request=FML32(name,pwd),reply=TPSUCCESS+FML32(id)
Output Pattern:
    service=FMLS_1,tuxservice=FMLS,inbuf=FML32,outbuf=FML32
        param: input(name, pwd), output(id)
```

-continued

```
Use case 5:
Input:
    service=FMLS,request=FML32(name,pwd),reply=TPSUCCESS+FML32(id)
    service=FMLS,request=FML32(name,pwd,token),reply=TPSUCCESS+FML32(id)
Output Pattern:
    service=FMLS__1,tuxservice=FMLS,inbuf=FML32,outbuf=FML32
        param: input(name, pwd), output(id)
    service=FMLS__2,tuxservice=FMLS,inbuf=FML32,outbuf=FML32
        param: input(name, pwd,token), output(id)
```

Once a pattern is processed, the service contract and/or its metadata is processed so it is in a format that can be stored in the service contract metadata repository. To provide a specific example, a service contract format is illustrated below:

Service Contract Output Format

The output should comply with the format imposed by tmloadrepos if a file is used as storage instead of metadata repository.

The file contains a service header section and a parameter section for each parameter. Service header contains items listed in Table 1. The "service" field is in the format of <RealServiceName>+'_'+<SequenceNo>. The suffix <SequenceNo> is introduced to avoid name conflict when multiple patterns are recognized for a Tuxedo™ service.

The section <SequenceNo> starts from the number succeed maximum <SequenceNo> stored in metadata repository already. For example, the system is indifferent to the number in the text input file but not injected to metadata repository yet.

TABLE 1

Service Level Attributes

| keyword (abbreviation) | Sample Value | Description |
|---|---|---|
| service(sv) | TOUPPER_1 | <RealServiceName>_<SequenceNo>. The service name. |
| tuxservice(tsv) | TOUPPER | |
| servicetype(st) | service\|oneway | oneway if TPNOREPLY is set. |
| inbuf(bt) | STRING | FML, FML32, VIEW, VIEW32, STRING, CARRAY, XML, X_OCTET, X_COMMON, X_C_TYPE, MBSTRING or other arbitrary string representing an application defined custom buffer type. |
| outbuf(BT) | FML32 | set to "NULL" if it's an error reply. |
| errbuf(ebt) | STRING | present only when it's an error reply. |
| inview | | View name. Present only when inbuf is of type VIEW or VIEW32. |
| outview | | View name. Present only when outbuf is of type VIEW or VIEW32. |
| errview | | View name. Present only when errbuf is of type VIEW or VIEW32. |
| autodiscovery | true\|false | set to "true". |

Service parameter contains information as shown in Table 2.

TABLE 2

Parameter Level Attributes

| Keyword (abbreviation) | Sample | Description |
|---|---|---|
| param(pn) | USER_INFO | |
| paramdescription(pd) | service parameter | |
| access(pa) | in | A combination of {in} {out} {err}. |
| type(pt) | fml32 | byte, short, integer, float, double, string, carray, dec_t, xml, ptr, fml32, view32, mbstring. |
| subtype(pst) | | A view name for a view or view32 typed parameter. |
| count | 100 | The maximum occurrence of FML/FML32 field watched during the collection period |
| requiredcount | 1 | The minimum occurrence of FML/FML32 field watched during the collection period. |

Now referring back to FIG. 2A. As explained above, the service contract and/or the metadata thereof is processed at step 224. At step 226, the service contract is forwarded to the client computer 202. The client computer 202 is then able to use the service.

FIG. 2B is a simplified timing diagram illustrating forwarding of service contract information according to an embodiment of the present invention. This diagram is merely an example, which should not unduly limit the scope of the claims. One of ordinary skill in the art would recognize many variations, alternatives, and modifications.

The process illustrated in FIG. 2B is in accordance with a specific embodiment of the present invention. As shown, the client computer 202 requests service using a routine named tpcall( ) to the service management server 204. The service management server 204 forward the service request to the application server 206 using a routine named tpforward( ). The application server 206 returns the requests with a routine named tpreturn( ).

When a service issues tpforward( ) instead of tpreturn( ) as illustrated in FIG. 2B, the reply buffer information gets from the reply buffer of the service which it forwards to. For example, the return buffer type for the service management server 204 is a "STRING" type for the following use case:

---

Use Case:
(1) client 202 calls server 204 (e.g., SVCA) with a STRING typed buffer;
(2) the SVCA processes the request, and then creates a new FML32 typed buffer as request forwarded to the server 205 (e.g., SVCB);
(3) SVCB handles the request and returns a STRING buffer to the client.

---

In an exemplary embodiment, the service contract for the service management server 204 is always collected no matter whether service discovery is turned on for the application server 206 or not with one exception. The exception is that, contract information for the service management server 204 cannot be collected if the application server 206 is running at a machine without this feature.

Figure 3:
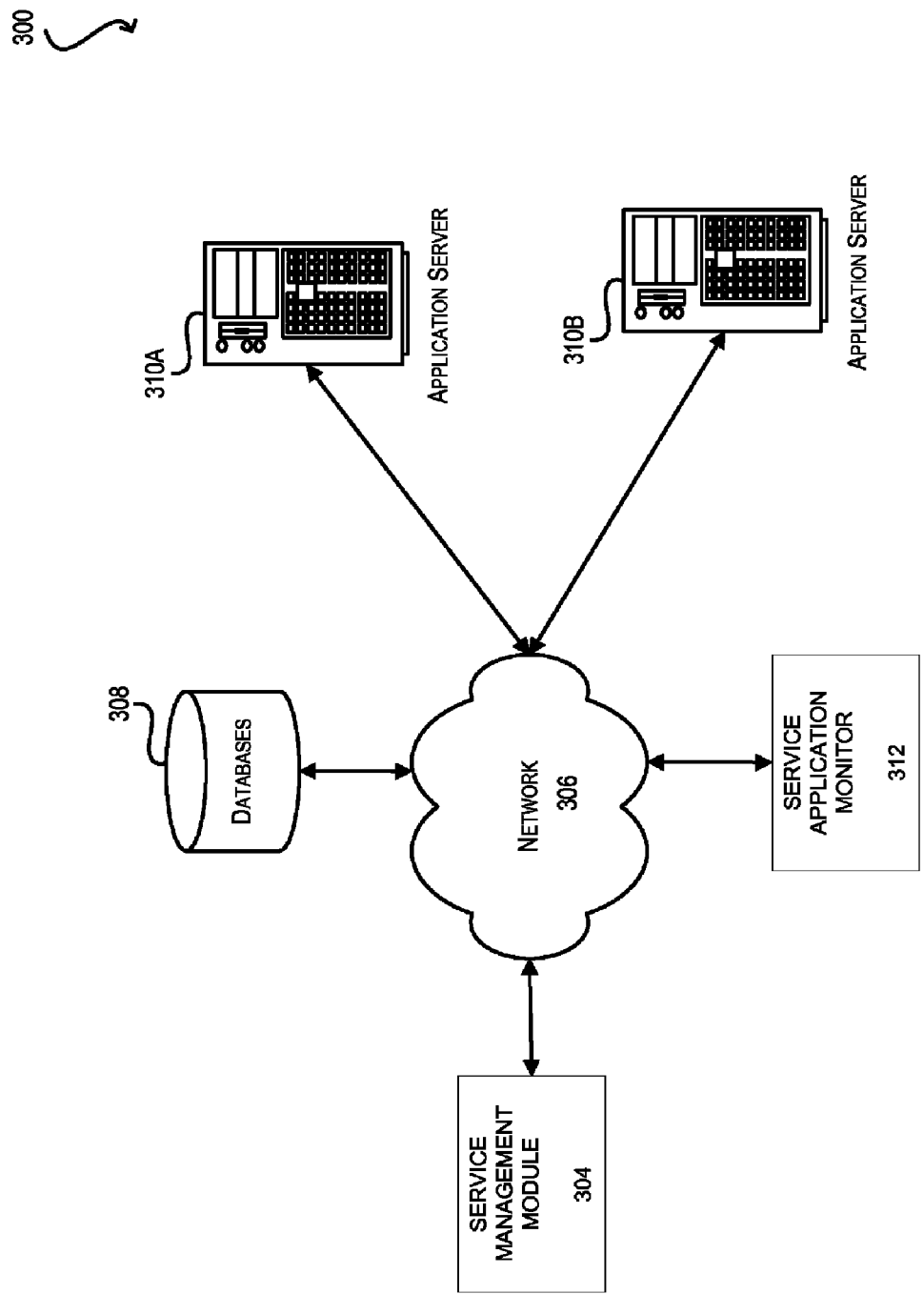
FIG. 3 is a simplified diagram illustrating a system in which a process is performed for generating service contract discovery.

FIG. 3 is a simplified diagram illustrating a system in which a process is performed for generating service contract discovery. This diagram is merely an example, which should not unduly limit the scope of the claims. One of ordinary skill in the art would recognize many variations, alternatives, and modifications.

As shown in FIG. 3, a service management module 304 is connected to application servers 310A and 310B via the network 306. As an example, the service management module 304 comprises a Tuxedo™ server. The application servers 310A and 310B comprise services that can be used by client computers. For example, the application servers 310A and 310B may provide service directly to client computers or through the service management service module 304. The service management module 304, among other features, is able to access the application servers 310A and 310B to retrieve service information. As shown in FIG. 3, the database 308 and the service application monitor 312 are also connected to the service management module 304. Depending on the applicant, the database 308 and the service application monitor 312 may also be a part of the service management module 304.

The database 308 contains, among other things, a metadata repository database for service contracts. For example, the database 308 stores service contracts according to the format described above in Tables 1 and 2. The database 308 is readily accessible to the service management module 304. For example, the service management module 304 is able to retrieve service contract information that is useful when providing services to clients. The service management module 304 additionally may store service contract information to the database 308 if a service contract is not already stored at the database 308 and/or needs updating.

The service application monitor 312 can be a part of the service management module 104 and/or the application server 310A. For example, the service application monitor 312 comprises a Tuxedo™ System and Application Monitor (TSAM), which is an add-on product for Tuxedo™. In an embodiment, the service application monitor 312 processes information associated with a contract that is being sent from the application server 310A to a client computer. The service application monitor 112 processes the service contract and stores it into the database 308 if the database does not already contact information for the service contract.

In various embodiments, the service management module 304 accesses, without receiving service requests from client computers, application servers 310A and 310B for the purpose of discovering service contracts that are not stored in the database. Depending on the setting as needed for specific applications, the service management module 304 may perform service contract discovery processes in various ways. In one embodiment, the service contract process is performed once only, which is suitable for service with only one contract. In another embodiment, a ratio/scheduler is used, and the service management module 304 performs service contract discovery processes periodically based on user settings. The service contract discovery process may be limited in discovery to domain, machine, group and/or server level.

Figure 4:
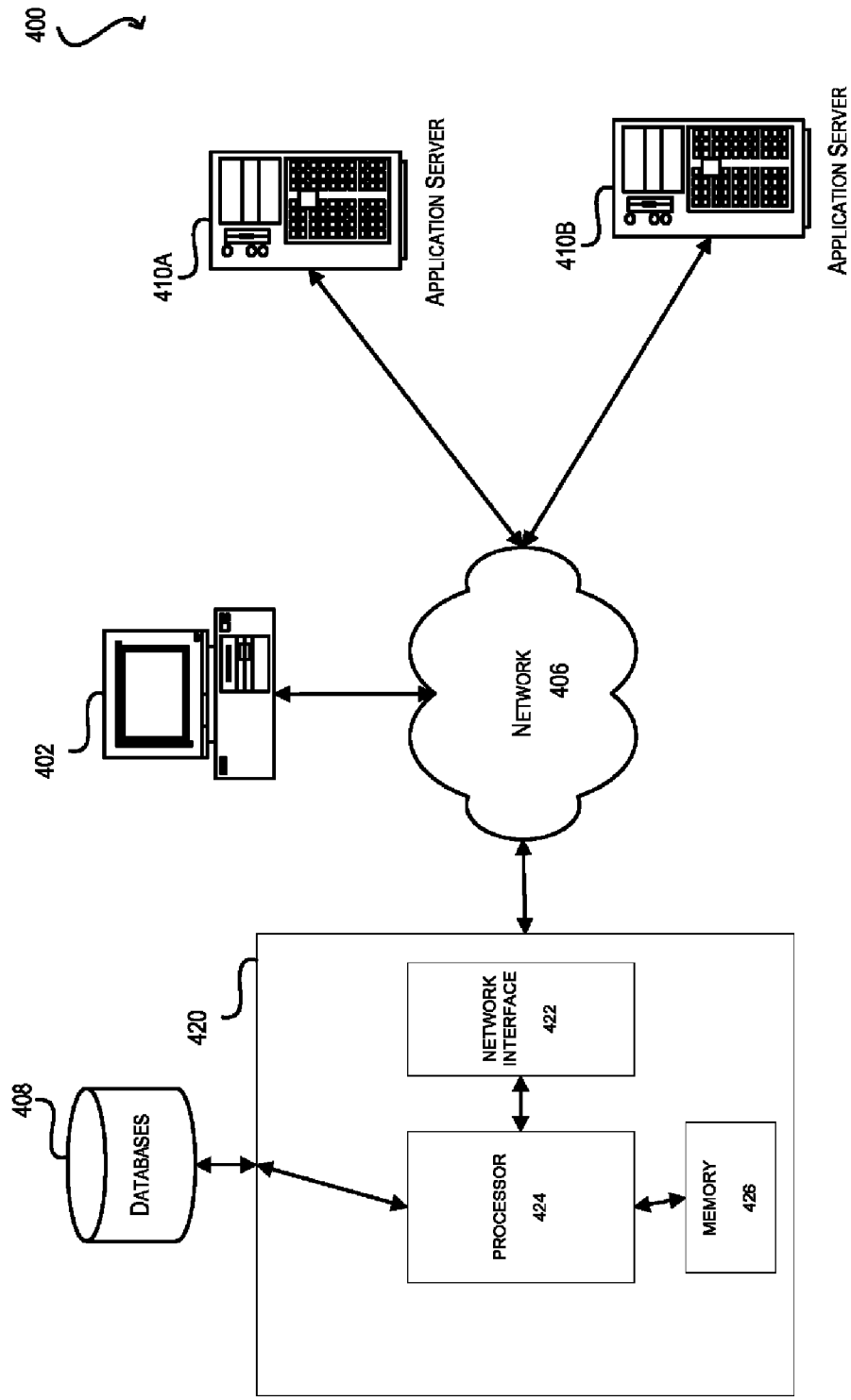
FIG. 4 is a simplified diagram illustrating a module for service contract discovery according to an embodiment of the present invention.

FIG. 4 is a simplified diagram illustrating a module for service contract discovery according to an embodiment of the present invention. This diagram is merely an example, which should not unduly limit the scope of the claims. One of ordinary skill in the art would recognize many variations, alternatives, and modifications.

As shown in FIG. 4, a service management module 420 is connected to application servers 410A and 410B via the network 406. As an example, the service management module 420 comprises a Tuxedo™ server. The application servers 410A and 410B comprises services that can be used by client computers. For example, the application servers 410A and 410B may provide service directly to client computer or through the service management module 420. The service management module 304, among other features, is able to access the application servers 410A and 410B to retrieve service information. As shown in FIG. 4, the database 408 is also connected to the service management module 420. Depending on the applicant, the database 308 may also be a part of the service management module 420.

The service management module 420 comprises, among other components, a processor 424, a network interface 422, and a memory 426. The service management module 420 communicates with the various entities using its network interface 422. For example, the network interface 422 is compatible with various types of communication protocols. The service management module 420 also includes processor 402 that is configured to perform a variety of tasks. For example, the processor 402 processes service requests from the client computer 402 and locates service at the application server 410A. When a service contract is provide by one of the application servers 410A and 410B, the processor 424 processes the service contract. In an embodiment, the processor looks up the database 408 to determine if the information associated with the service contract is already in the database 408. If the service contract is not already stored in the database 408, the processor 424 processes the service contract and generates a set of information related to the service contract for the purpose of storing in the database 408. As an example, the process for processing service contracts and storing the information thereof is described above. In addition to the processor 424 and the network interface 422, the service management module 420 also includes a memory 426, which is able to store various information associated with the service contract.

Figure 5:
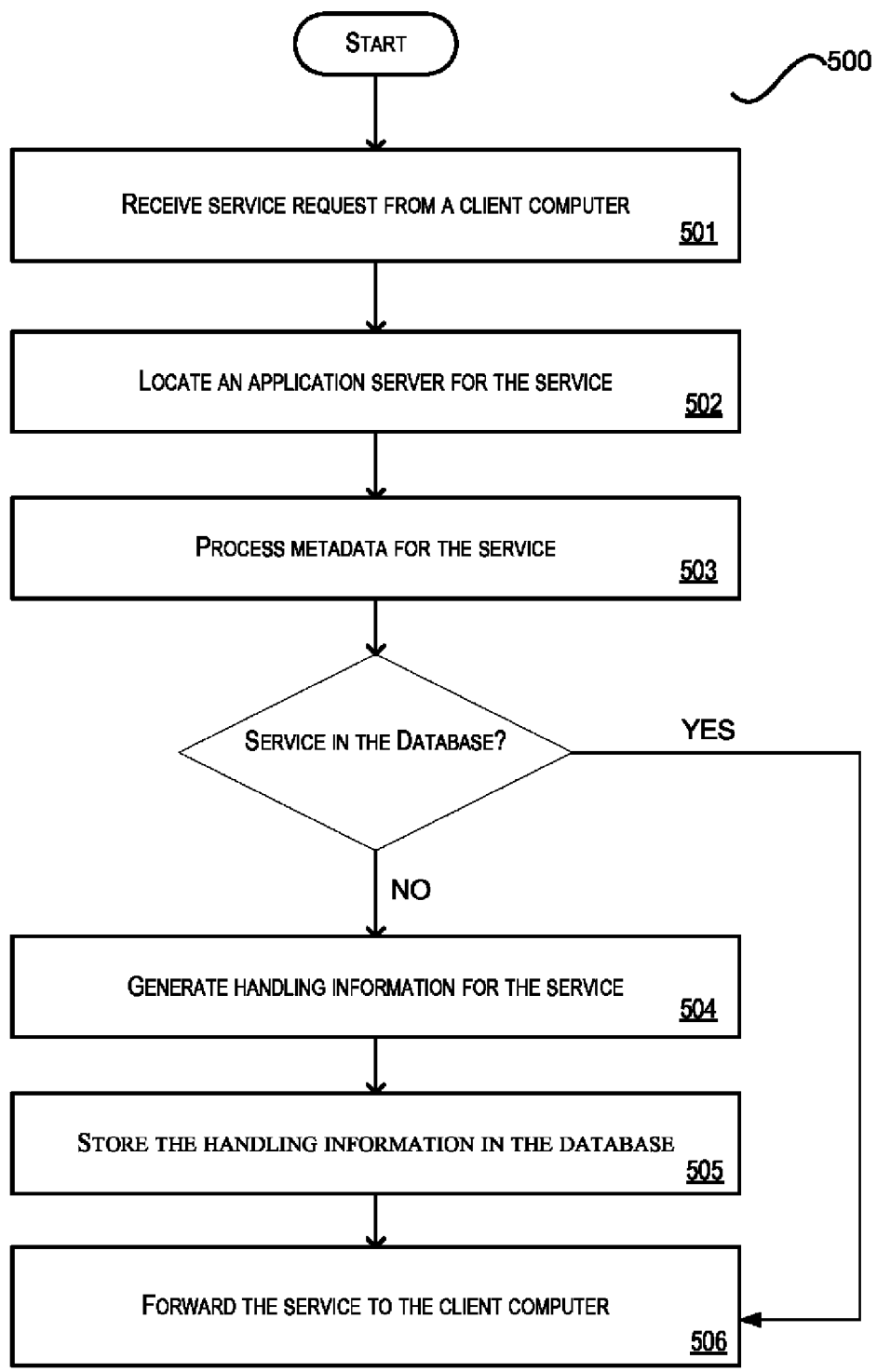
FIG. 5 is a simplified flow diagram illustrating a process for generating information associated with service contracts.

FIG. 5 is a simplified flow diagram illustrating a process for generating information associated with service contracts. This diagram is merely an example, which should not unduly limit the scope of the claims. One of ordinary skill in the art would recognize many variations, alternatives, and modifications. As an example, various steps illustrated in FIG. 5 may be added, removed, repeated, replaced, modified, and/or overlapped.

As shown in FIG. 5, the process 500 starts with receiving a service request from a client computer at step 501. As an example, the service request is transmitted through a network and processed by a service management module (e.g., a Tuxedo™ server).

Next, an application server containing the requested service is located at step 502. For example, the application server may be a Tuxedo™ server receiving the service request or different server on the network.

Metadata associated with the requested service is processed at step 503. For example, the metadata includes information such as handling instructions, buffer states, and others, using which the requested service may be properly processed. For example, through processing the metadata associated with the service, a service contract is generated.

Once the service contract is generated, the service contract is sent to the client computer requesting the service. If the service contract is already stored in a database (e.g., metadata repository), the service is simply forwarded to the client computer at step 506.

On the other hand, if the service contract is not in the data, the service contract is first processed at step 504 to generate various handling information. For example, the process for generating handling information is described above, in which one or more patterns associated with the service contract are identified and processed.

At step 505, the processed information based on the service contract is stored at the database. For example, the processed information conforms to a predefined format. In an embodiment, the format for storing the processed information is provided in Tables 1 and 2.

Figure 6:
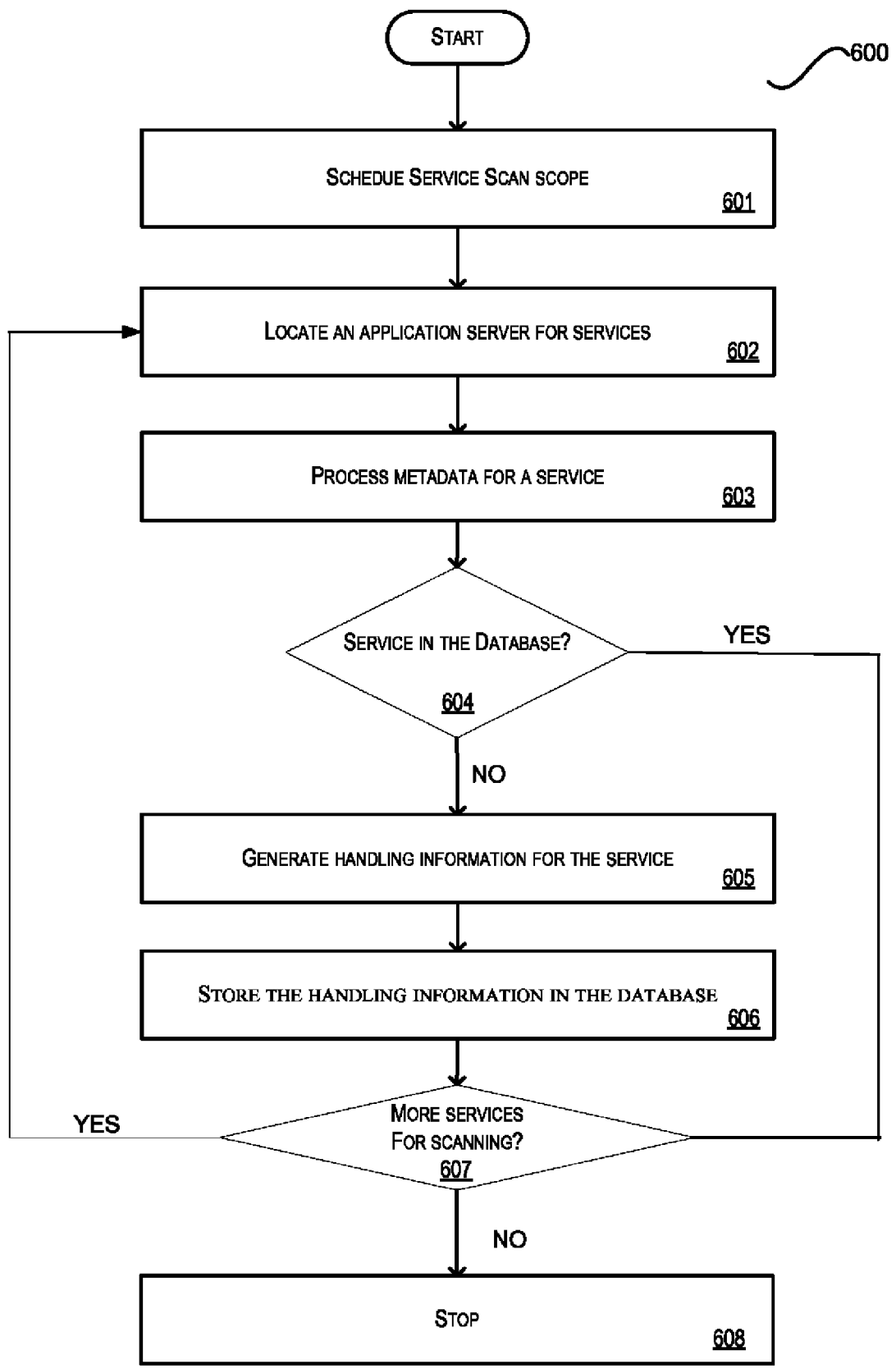
FIG. 6 is a simplified flow diagram illustrating a process for automatically discovering and generating information associated with service contracts.

FIG. 6 is a simplified flow diagram illustrating a process for automatically discovering and generating information associated with service contracts. This diagram is merely an example, which should not unduly limit the scope of the claims. One of ordinary skill in the art would recognize many variations, alternatives, and modifications. As an example, various steps illustrated in FIG. 6 may be added, removed, repeated, replaced, modified, and/or overlapped.

In contrast to process 500, process 600 illustrated in FIG. 6 is used for automatic service contract discovery. That is, a server searches for a service contract that is not stored in a database and stores information associated with the service contract in the database.

At step 601, a service scan is scheduled. Depending on the application, the scanning process for service may be scheduled in various ways, such as once only, periodically at specific intervals, performed when new server is detected, etc. The scope of the scanning varies based on user setting. For example, the scanning may be limited to a specific machine, machines in the same domain, machines that are in the same service group, etc.

Once it is determined that a service scan is to be performed based on what has been scheduled in step 601, a service scan is performed. For example, in step 602, a service is located in a database.

The metadata of the located service is processed in step 603. The metadata includes information such as handling instructions, buffer states, and others, using which the located service may be properly processed. For example, through processing the metadata associated with the service, a service contract is generated.

Based on the metadata, a determination is made at step 604 as to whether the service has already been stored in a database. As shown in FIG. 6, if the service has already been stored in the database, the process 600 moves to step 607 to see if there are more services to be located. If there are more services to be located, the process 600 moves back to step 602 to locate more services. On the other hand, if there is no more scanning for services (e.g., all services within a domain have been scanned according to the schedule), the process stops at step 608.

At step 604, if it is determined that the service is not already in the database, the service is processed at step 605. For example, the process for generating handling information is described above, in which one or more patterns associated with the service contract is identified and processed.

At step 606, the processed information based on the service contract is stored at the database. For example, the processed information conforms to a predefined format. In an embodiment, the format for storing the processed information is provided in Tables 1 and 2. After storing the processed service contract, the process 600 moves to step 607 to see if there are more services to be located and/or processed.

Figure 7:
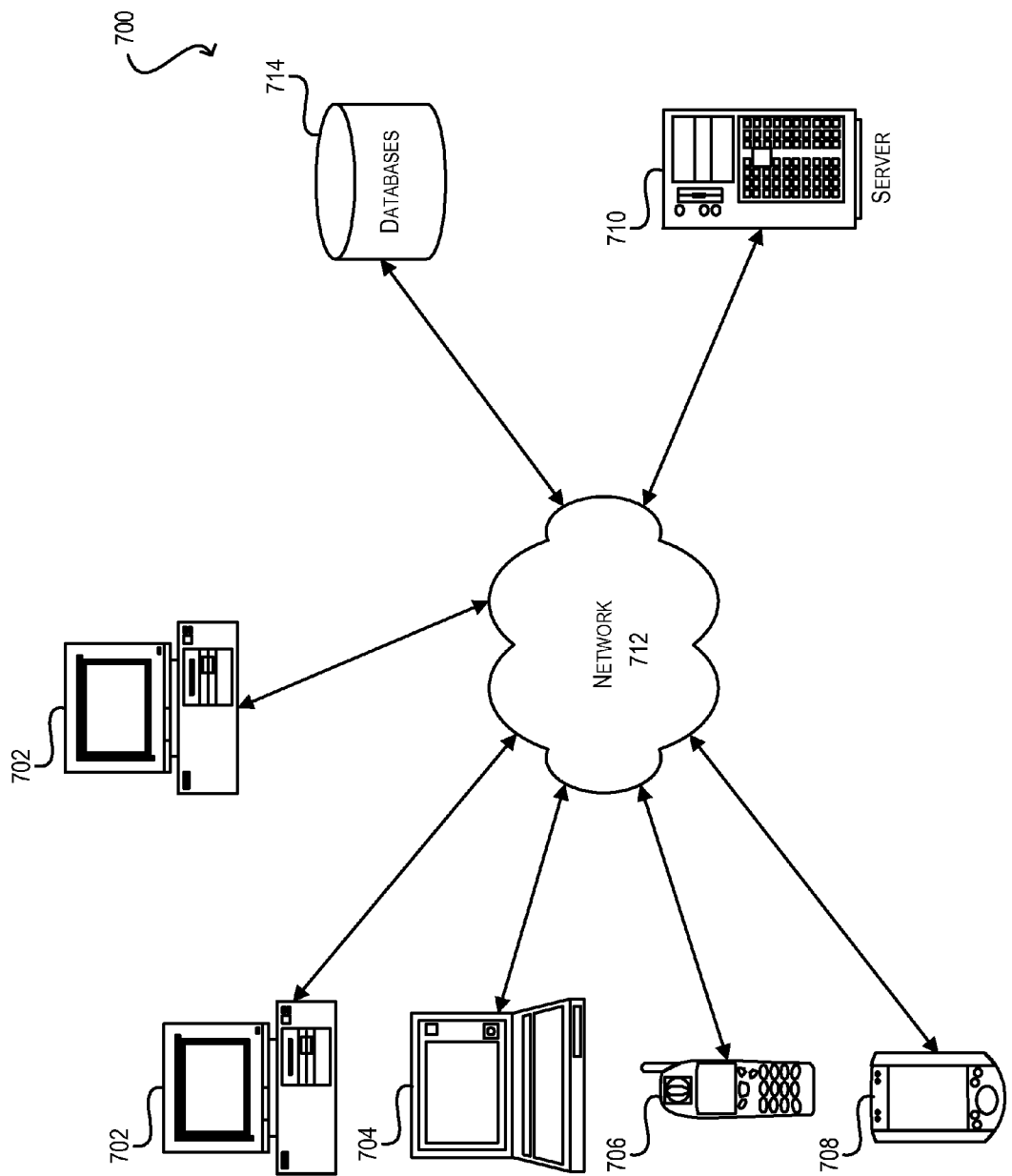
FIG. 7 is a simplified block diagram illustrating physical components of a system environment 700 that may be used in accordance with an embodiment of the present invention.

It is to be appreciated that the graphical user interface can be implemented with various types of hardware systems. FIG. 7 is a simplified block diagram illustrating physical components of a system environment 700 that may be used in accordance with an embodiment of the present invention. This diagram is merely an example, which should not unduly limit the scope of the claims. One of ordinary skill in the art would recognize many variations, alternatives, and modifications.

As shown, system environment 700 includes one or more client computing devices 702, 704, 706, 708 communicatively coupled with a server computer 710 via a network 712. In one set of embodiments, client computing devices 702, 704, 706, 708 may request service from the server computer 710. For example, each of the client computing devices may be compatible with the message format of Tuxedo™ system.

Client computing devices 702, 704, 706, 708 may be general purpose personal computers (including, for example, personal computers and/or laptop computers running various versions of Microsoft Windows™ and/or Apple Macintosh™ operating systems), cell phones or PDAs (running software such as Microsoft Windows Mobile™ and being Internet, e-mail, SMS, Blackberry™, and/or other communication protocol enabled), and/or workstation computers running any of a variety of commercially-available UNIX™ or UNIX™-like operating systems (including without limitation the variety of GNU/Linux™ operating systems). Alternatively, client computing devices 702, 704, 706, and 708 may be any other electronic devices capable of communicating over a network (e.g., network 712 described below) with server computer 710. Although system environment 700 is shown with four client computing devices and one server computer, any number of client computing devices and server computers may be supported.

Server computer 710 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 710 may run an operating system including any of those discussed above, as well as any commercially available server operating system. Server computer 710 may also run any variety of server applications and/or mid-tier applications, including web servers, Java™ virtual machines, application servers, database servers, and the like. In various embodiments, server computer 710 is adapted to run one or more Web services or software applications described in the foregoing disclosure. For example, server computer 710 may provide the abovementioned graphic user interface and functionalities thereof. In an embodiment, the server computer is compatible with Tuxedo™ system and is able to both locate and process services.

As shown, client computing devices 702, 704, 706, 708 and server computer 710 are communicatively coupled via network 712. Network 712 may be any type of network that can support data communications using any variety of commercially-available protocols, including without limitation TCP/IP, SNA, IPX, AppleTalk™, and the like. Merely by way of example, network 712 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infrared network; a wireless network (e.g., a network operating under any of the IEEE 802.11 suite of protocols, the Bluetooth™ protocol known in the art, and/or any other wireless protocols); and/or any combination of these and/or other networks. In various embodiments, the client computing devices 702, 704, 706, 708 and server computer 710 are able to access the database 714 through the network 712. In certain embodiments, the client computing devices 702, 704, 706, 708 and server computer 710 each has its own database. For example, the database 714 comprises a metadata repository database for storing metadata associated with service contracts.

System environment 700 may also include one or more databases 714. Database 714 may correspond to an instance of integration repository as well as any other type of database or data storage component described in this disclosure. Database 714 may reside in a variety of locations. By way of example, database 714 may reside on a storage medium local to (and/or residing in) one or more of the client computing devices 702, 704, 706, 708, 710. Alternatively, database 714 may be remote from any or all of the client computing devices 702, 704, 706, 708, 710 and/or in communication (e.g., via network 712) with one or more of these. In one set of embodiments, database 714 may reside in a storage-area network (SAN) familiar to those skilled in the art. Similarly, any necessary files for performing the functions attributed to the client computing devices 702, 704, 706, 708, 710 may be stored locally on the respective computer and/or remotely on database 714, as appropriate. In one set of embodiments, database 714 is a relational database, such as Oracle 10g™ available from Oracle Corporation that is adapted to store, update, and retrieve data in response to SQL-formatted commands. In various embodiments, the database 714 stores data in a format that is described in Tables 1 and 2.

Figure 8:
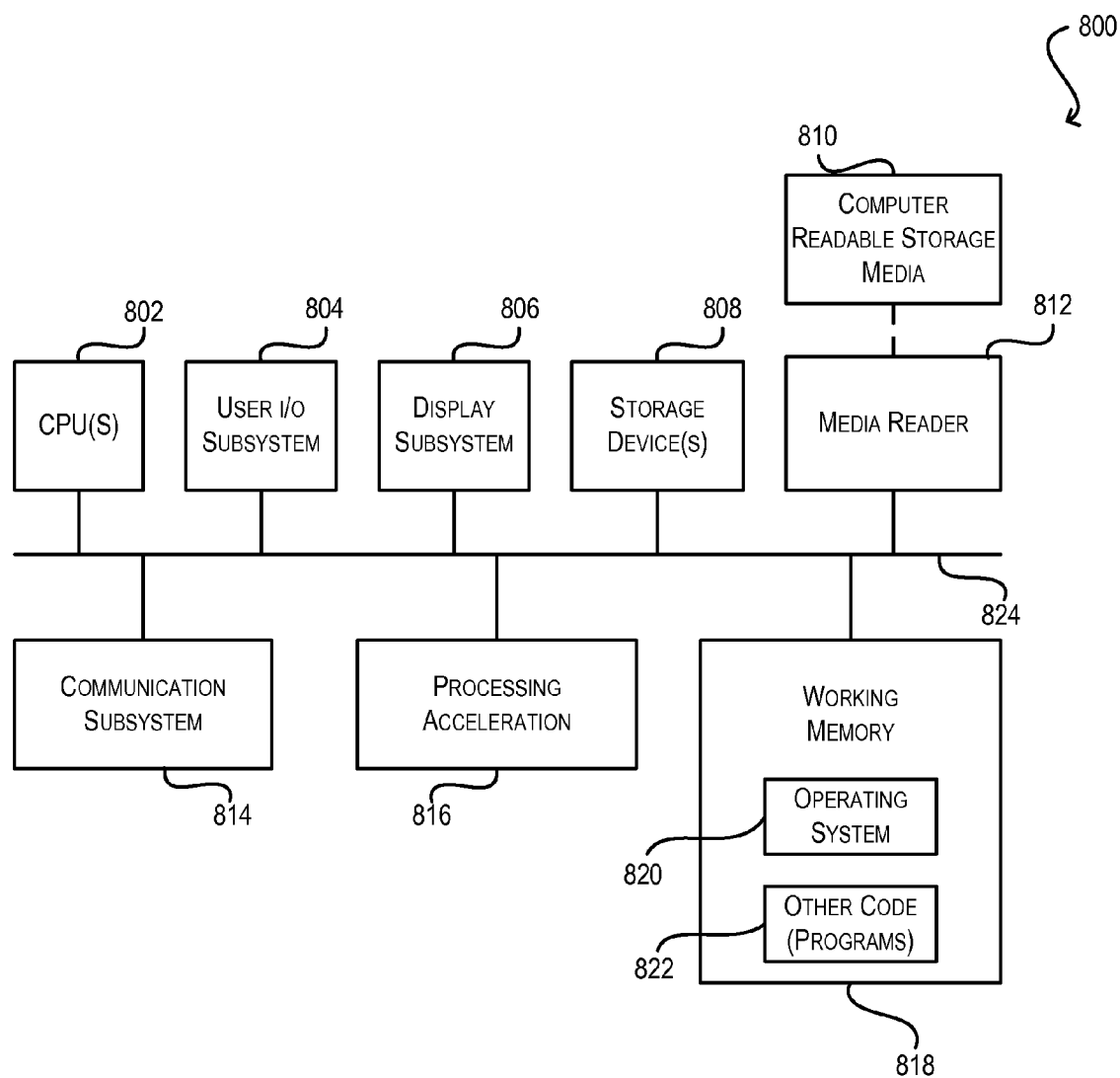
FIG. 8 is a simplified block diagram illustrating physical components of a computer system 800 that may be used in accordance with an embodiment of the present invention.

FIG. 8 is a simplified block diagram illustrating physical components of a computer system 800 that may be used in accordance with an embodiment of the present invention. This diagram is merely an example, which should not unduly limit the scope of the claims. One of ordinary skill in the art would recognize many variations, alternatives, and modifications.

In various embodiments, computer system 800 may be used to implement any of the client computing devices 702, 704, 706, 708, 710 illustrated in system environment 700 described above. As shown in FIG. 8, computer system 800 comprises hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). For example, the input device 804 is used to receive user inputs. Computer system 800 may also include one or more storage devices 808. By way of example, storage device(s) 808 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage device 808. For example, the central processing unit 802 is configured to process service contract information. In addition, a user may use computer system 800 to schedule service contract discovery processes.

Computer system 800 may additionally include a computer-readable storage media reader 812, a communications subsystem 814 (e.g., a modem, a network card (wireless or wired), an infrared communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications subsystem 814 may permit data to be exchanged with network 712 of FIG. 7 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable codes and associated data structures for one or more of the design-time or runtime components/services illustrated in FIGS. 2 and 4. It should be appreciated that alternative embodiments of computer system 800 may have numerous variations from that described above. For example, customized hardware might also be used and/or particular elements might be implemented in hardware, software (including portable software, such as Applets™), or both. Further, connection to other computing devices such as network input/output devices may be employed. In various embodiments, the behavior of the zoom functions described throughout the present application is implemented as software elements of the computer system 800.

In one set of embodiments, the techniques described herein may be implemented as program code executable by a computer system (such as a computer system 800) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. Further, while embodiments of the present invention have been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A non-transitory computer-readable storage medium comprising processor executable codes, the computer-readable storage medium comprising:
   code for accessing at least one application server, the at least one application server storing at least a first service, the first service being characterized by a first set of metadata, the first set of metadata including a plurality of fields;
   code for processing the first set of metadata;
   code for obtaining at least a first identification from the first set of metadata;
   code for accessing a metadata database, the metadata database being configured to store metadata information associated with services;
   code for searching the metadata database for the first service using at least the first identification;
   code for in response to the first service not being found in the database, generating handling information for the first service, wherein the handling information includes identification and processing information for one or more patterns associated with the first service; and
   code storing the first set of metadata in the metadata database in a first format and the handling information.

2. The non-transitory computer-readable storage medium of claim 1 further comprising:
   code for processing a service request from a computer;
   code for locating the first service; and
   code for providing the first service to the computer.

3. The non-transitory computer-readable storage medium of claim 1 further comprising:
   code for processing the service request from a terminal;
   code for processing the service request;
   code for looking up the metadata database in response to the service request; and
   code for defining a service contract for the first service using the first set of metadata stored in the metadata database.

4. The non-transitory computer-readable storage medium of claim 1 further comprising:
   code for obtaining a second set of metadata from the metadata database; and
   code for providing a second service with the second set of metadata.

5. The non-transitory computer-readable storage medium of claim 1 wherein the metadata database is stored on a metadata database repository server.

6. The non-transitory computer-readable storage medium of claim 1 further comprising code for determining a license associated with the first application.

7. The non-transitory computer-readable storage medium of claim 1 further comprising code for establishing a communication link between the application server and a computer.

8. A system for providing services, the system comprising:
   a communication network;
   a first computer connected to the communication network, the first computer being adapted to send a first service request;
   a metadata database for storing metadata information associated with services;
   a first application server, the first application server storing at least a first service, the first service being characterized by a first set of metadata, the first set of metadata including a plurality of fields;
   a service management module, the service management module being adapted to receive the first service request from the first computer via the communication network;
   wherein:
      the service management module processes the first service request;
      the service management module locates the first service in response to the first service request;
      the service management module obtains the first set of metadata from the first application server;
      the service management module generates handling information for the first service, wherein the handling information includes identification and processing information for one or more patterns associated with the first service;
      the service management module processes the first set of metadata;
      the service management module accesses the metadata database to determine if the metadata database includes information associated with the first set of data; and
      the metadata database generates and stores information associated with the first set of data if the metadata database does not include information associated with the first set of data.

9. The system of claim 8 further comprising a plurality of application servers connected to the service management module through the communication network.

10. The system of claim 8 wherein the metadata database is stored in a service metadata repository server.

11. The system of claim 8 further comprising a service monitoring module configured to monitor service requests.

12. The system of claim 8 wherein the service management module comprises a Tuxedo™ server.

13. The system of claim 8 is associated with a service-oriented architecture.

14. A method for operating providing one or more services in a network environment, the method comprising:
   providing a communication network;
   providing a service management module;
   providing a first server, the first server comprising a first service, the first service being characterized by a first set of metadata, the first set of metadata including a plurality of fields;
   providing a metadata database for storing metadata information associated with services;
   accessing the first set of metadata stored at the first server by the service management module;
   accessing the metadata database to determine if the metadata database includes information associated with the first set of data;
   in response to the first service not being found in the database, generating handling information for the first service, wherein the handling information includes identification and processing information for one or more patterns associated with the first service; and
   generating and storing the information associated with the first set of metadata if the metadata database does not include information associated with the first set of data.

15. The method of claim 14 further comprising scheduling a scanning for services.

16. The method of claim 14 further comprising storing the information associated with the first set of metadata in a table format.

17. The method of claim 14 further comprising summarizing the first set of data to generate the information associated with the first set of metadata.

18. The method of claim 14 further comprising forward parameters from the information associated with the first set of metadata to a client computer.

19. The method of claim 14 wherein the information associated with the first set of metadata comprises a service contract pattern.

* * * * *

UNITED STATES PATENT AND TRADEMARK OFFICE
CERTIFICATE OF CORRECTION

PATENT NO. : 8,326,913 B2  
APPLICATION NO. : 12/492084  
DATED : December 4, 2012  
INVENTOR(S) : Chen et al.

Page 1 of 1

It is certified that error appears in the above-identified patent and that said Letters Patent is hereby corrected as shown below:

On sheet 7 of 9, in figure 6, (Reference Numeral 601), line 1, delete "SCHEDUE" and insert -- SCHEDULE --, therefor.

Signed and Sealed this  
Twelfth Day of March, 2013

Teresa Stanek Rea  
*Acting Director of the United States Patent and Trademark Office*